(12) United States Patent
Gallegos et al.

(10) Patent No.: US 8,135,012 B2
(45) Date of Patent: *Mar. 13, 2012

(54) REDUNDANT ROUTING OF DATA IN A NETWORK

(75) Inventors: Joseph A. Gallegos, Fountain Valley, CA (US); David G. Otto, Santa Ana, CA (US); Scott J. Meier, Yorba Linda, CA (US); Albert E. Manfredi, Alexandria, VA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/852,087

(22) Filed: Aug. 6, 2010

(65) Prior Publication Data

US 2010/0325310 A1 Dec. 23, 2010

Related U.S. Application Data (62) Division of application No. 11/747,509, filed on May 11, 2007, now Pat. No. 7,792,109.

(51) Int. Cl.
*H04L 12/28* (2006.01)
(52) U.S. Cl. ...................................... 370/390
(58) Field of Classification Search .................. 370/390, 370/389, 351, 463, 419, 392, 386, 395.71, 370/254

See application file for complete search history.

(56) References Cited

U.S. PATENT DOCUMENTS

| | | | |
|---|---|---|---|
| 5,537,142 A | 7/1996 | Fenouil | 725/105 |
| 6,131,117 A * | 10/2000 | Clark et al. | 709/223 |
| 6,198,403 B1 | 3/2001 | Dorrough et al. | 340/635 |
| 6,343,083 B1 * | 1/2002 | Mendelson et al. | 370/466 |
| 6,674,760 B1 * | 1/2004 | Walrand et al. | 370/411 |
| 6,879,559 B1 | 4/2005 | Blackmon et al. | 370/225 |
| 6,973,041 B1 | 12/2005 | Duschatko et al. | 370/244 |
| 7,093,160 B2 | 8/2006 | Lau et al. | 714/11 |
| 7,107,334 B1 * | 9/2006 | Shaffer et al. | 709/224 |
| 7,136,382 B1 | 11/2006 | Sharma et al. | 370/392 |
| 7,269,649 B1 | 9/2007 | Brown et al. | 709/224 |
| 7,792,109 B2 * | 9/2010 | Gallegos et al. | 370/390 |
| 2002/0075873 A1 * | 6/2002 | Lindhorst-Ko et al. | 370/394 |
| 2003/0231632 A1 * | 12/2003 | Haeberlen | 370/395.5 |
| 2004/0042175 A1 | 3/2004 | Kehret et al. | 361/690 |
| 2006/0198296 A1 | 9/2006 | Majee et al. | 370/216 |

OTHER PUBLICATIONS

Meier, Scott J. and Manfredi, Albert, The Boeing Company, Anaheim, CA; Gigabit Ethernet Data Multiplex System (GEDMS)—Enabling the Net-Centric Evolution of Navy Combatants; published Oct. 2006.

PCT International Search Report and Written Opinion of the International Searching Authority, International application No. PCT/US2008/063289; date of mailing Jul. 11, 2008.

* cited by examiner

*Primary Examiner* — Kwang B Yao
*Assistant Examiner* — Anh Ngoc Nguyen
(74) *Attorney, Agent, or Firm* — Harness, Dickey & Pierce, P.L.C.

(57) ABSTRACT

A router for routing data redundantly relative to a network. The router includes a circuit card having a processor, a user port for connecting at least one user device with the processor, and a plurality of interface ports for redundantly connecting the processor with the network to provide active redundant communication with the user device(s). This router can have a small form factor, can be ruggedized, and can provide fast redundant routing through redundant network backbones.

6 Claims, 6 Drawing Sheets

REDUNDANT ROUTING OF DATA IN A NETWORK

CROSS-REFERENCE TO RELATED APPLICATIONS

This application is a divisional application and claims the benefit of U.S. patent application Ser. No. 11/747,509 filed on May 11, 2007, the disclosure of which is incorporated herein by reference.

FIELD

The present disclosure relates generally to communications networks and, more particularly but not exclusively, to redundant routing of data in a network at, or near, wire speed.

BACKGROUND

The statements in this section merely provide background information related to the present disclosure and may not constitute prior art.

A network may provide for redundant communication to ensure that transmissions are not lost or delayed, e.g., in the event of failure of a portion of the network. Where active redundancy is provided, e.g., where data is sent simultaneously over two or more backbones of a network, switch-over delays can be eliminated in the event of failure of one of the backbones. Redundancy may be used to safeguard communication in environments such as large ships, where networks may control various critical, tactical onboard systems and devices. In such networks, it can be particularly desirable to provide for rapid communication without data bottlenecks or fail-over delays.

SUMMARY

The present disclosure, in one implementation, is directed to a router for routing data redundantly relative to a network. The router includes a circuit card having a processor, a user port for connecting at least one user device with the processor, and a plurality of interface ports for redundantly connecting the processor with the network to provide active redundant communication with the at least one user device.

In another implementation, the disclosure is directed to a router for routing data redundantly relative to a network. The router includes an enclosure, a user port provided in the enclosure through which the router is connectable with at least one user device, and a plurality of interface ports provided in the enclosure through which the router is connectable with the network to provide active redundant communication with the at least one user device.

In yet another implementation, the disclosure is directed to a method of routing data between a user device and a network. A packet from the user device is received. The method includes configuring the received packet in accordance with a protocol for redundant communication over the network, and transmitting the configured packet redundantly to the network. The method is performed using a single circuit card of a router.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
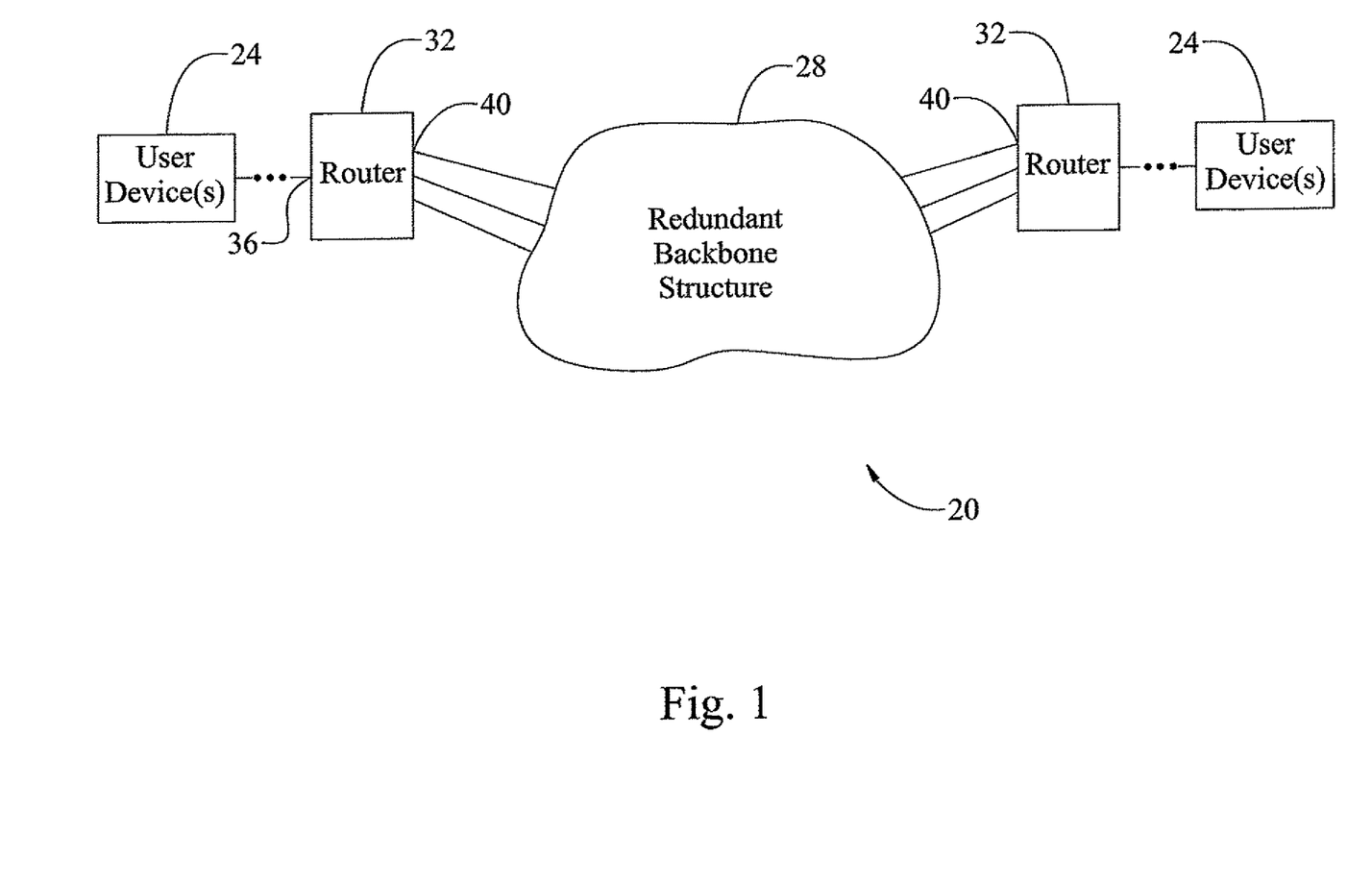
FIG. 1 is a diagram of a network in which a redundant router may be used in accordance with one implementation of the disclosure.

One embodiment of a network in which a redundant router may be used is indicated generally in FIG. 1 by reference number 20. A plurality of user devices 24 may communicate with one another via an actively redundant backbone structure 28 of the network 20. More specifically, data frames from user device(s) 24 may be transmitted to other user device(s) 24 redundantly over a plurality of backbone network interfaces of the backbone structure 28. Duplicate frames may be detected and rejected upon receipt. In such manner, switch-over delay can be eliminated in the event of failure of fewer than all of the backbone network interfaces.

In various implementations of the disclosure, a user device 24 may access the redundant backbone structure 28 via a redundant router 32. The router 32 includes a user port 36 through which the router 32 is connectable with user device(s) 24. The router 32 also includes a plurality of interface ports 40 through which the router 32 is connectable with the backbone structure 28. In the present exemplary configuration, the router 32 has three interface ports 40, each of which is configured to interface with one of three redundant backbone networks which may be separate and mutually isolated from one another, in the structure 28. In such multiple-network backbone configurations, failure and recovery of the individual backbone networks will not interrupt communications between redundant routers even momentarily, unless all of the backbone networks fail simultaneously. It should be understood, however, that various router configurations could interface with fewer or more than three redundant backbone networks. Further, it should be noted that some router configurations may be used to interface redundantly with structures other than backbone networks.

Figure 2:
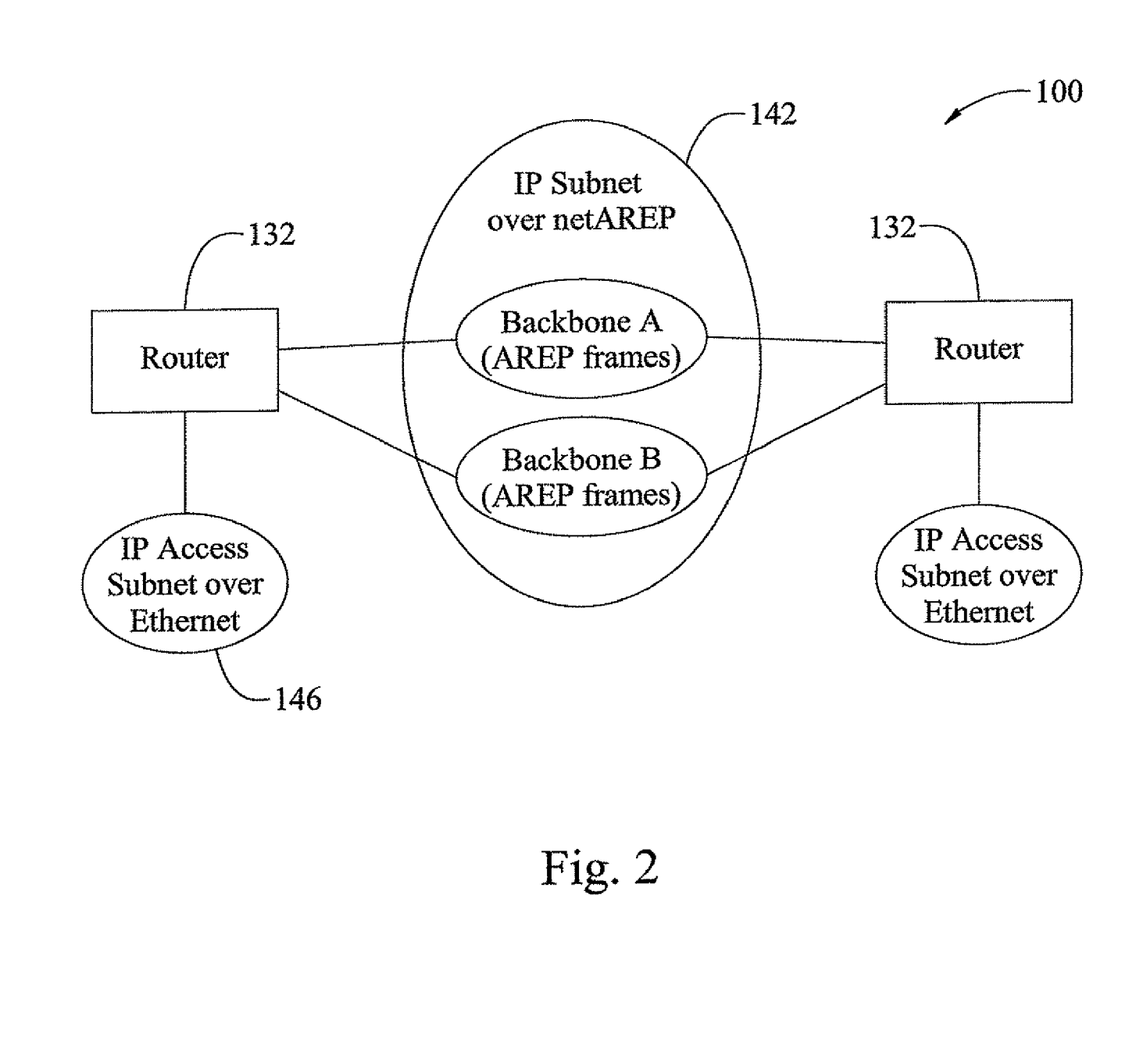
FIG. 2 is a diagram of a network in which a redundant router may be used in accordance with one implementation of the disclosure.

One configuration of a network in which redundant routing may be performed is indicated generally in FIG. 2 by reference number 100. The network 100 may be or include a general-purpose backbone network for use by various systems. One such network is the Gigabit Ethernet Data Multiplex System (GEDMS) for use by U.S. Navy ship systems. It should be noted, however, that the disclosure could be implemented in connection with many types of networks, including but not limited to commercial ship networks and land-based networks, e.g., factory, educational, and other non-military networks.

In the network 100, at least one redundancy protocol is used by routers 132 to send frames simultaneously over two Gigabit Ethernet backbone mesh networks 138, also referred to as backbones A and B. One such protocol is AREP (Active Redundancy Protocol), although other or additional redundancy protocols may be used in other implementations. As further described below, AREP may be used to establish a single "IP-over-netAREP" virtual backbone network 142, layered on top of the backbone mesh networks A and B. Duplicate frames are transmitted simultaneously over both backbone Ethernets 138, and duplicates are discarded at the receiving side. In such manner, routers 132 may route IP packets between end user access IP subnets 146 and the backbone virtual IP subnet 142, at speeds approaching wire speed.

Operation of AREP may be described relative to the well-known International Standards Organization Open System Interconnect (ISO/OSI) model. An operational model applicable to the network 100 is indicated generally in FIG. 3 by reference number 200. Protocols used in OSI layers 7, 6 and 5 (i.e., the application, presentation, and session layers) are followed by application programs for IP devices accessing the network 100. At OSI layer 4 (i.e., the transport layer), TCP (Transmission Control Protocol) and/or UDP (User Datagram Protocol) may be used. At the network layer (OSI layer 3), IP (Internet Protocol) is used for IP devices.

Figure 3:
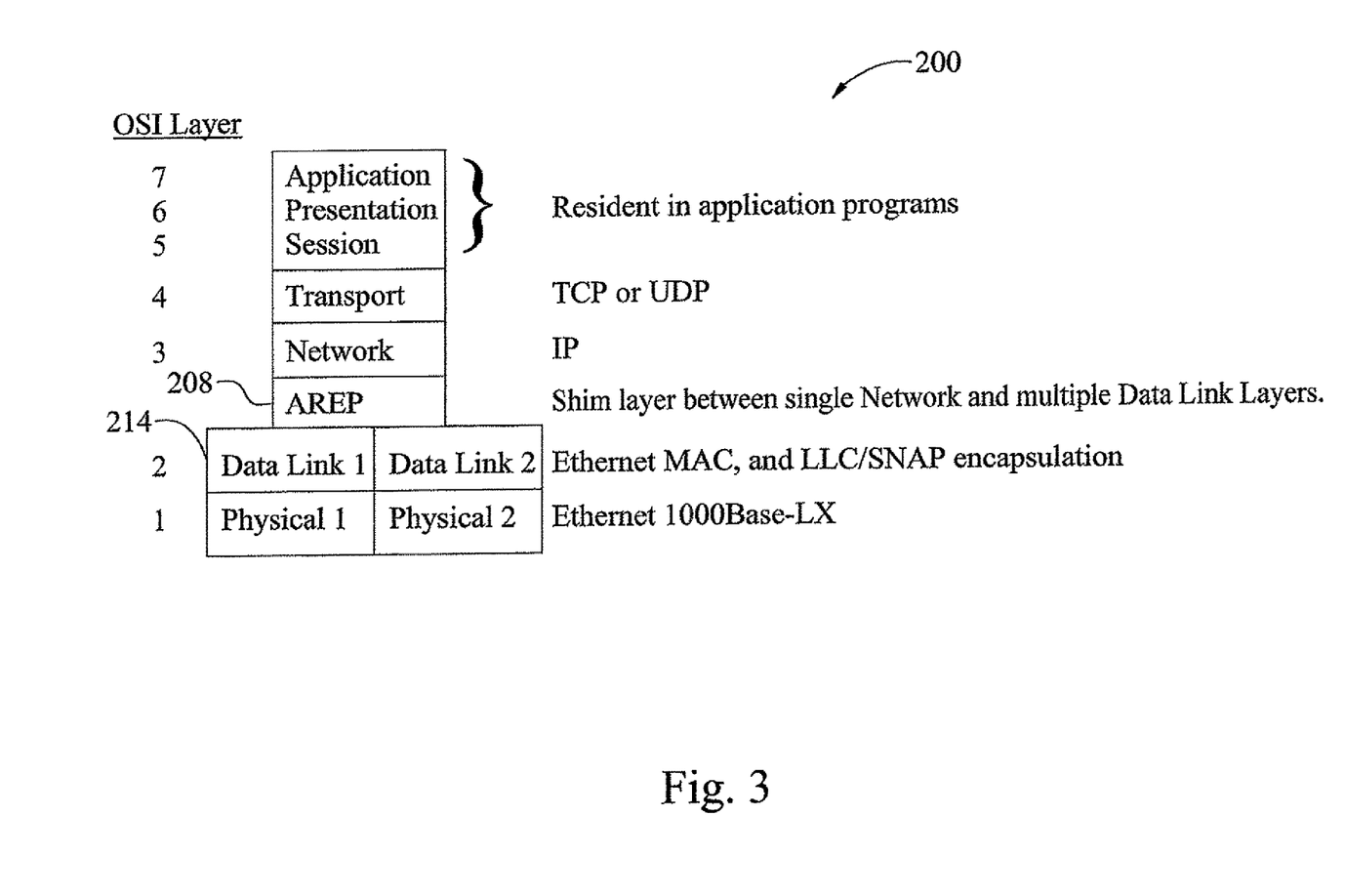
FIG. 3 is a diagram of an operational model relative to a network in which redundant routing may be performed in accordance with one implementation of the disclosure.

AREP operates as a shim layer 208 between the OSI network layer and a plurality of data link layers 214 at OSI level 2. AREP provides active redundancy. Accordingly, each data link layer 214 corresponds to a backbone mesh A or B. The backbone networks A and B use the Ethernet "length" frame format in the present exemplary implementation. In such manner, use of LLC/SNAP headers is accommodated. In various implementations of the disclosure, the router 132 configures an IP packet received from a user device for transmission in accordance with AREP and transmits the packet simultaneously to the backbones A and B. An exemplary backbone Ethernet frame format including an AREP header is shown in Table 1.

TABLE 1

| Preamble, SFD | Preamble, Start Frame Delimiter |
| MAC DA | MAC destination address |
| MAC SA | MAC source address |
| Length | Less than 1536 indicates "length" format, in bytes |
| LLC Header | 0xAA-AA-03 |
| SNAP Header | AREP = 0x00-50-93-80-01 |
| AREP Header | Arbitration, priority, maintenance info |
| Data | Data message, including all IP headers |
| FCS | Cyclic Redundancy Check |

It should be noted that the backbones A and B could use, and/or the router 132 could support, other or additional redundancy protocols. One such protocol is FLiP (FODMS Lightweight Protocol), currently in use by the United States Navy. FLIP also operates as a shim between OSI network and data link layers. Through the use of FLiP, the redundant router 132 can directly support communications between IP and non-IP end user devices. Generally, where a redundancy protocol is used in which data packets are configured above the link layer and below the network layer, the router 132 may be used to configure packets in accordance with such protocol.

It should be noted generally that various configurations of the router may be used to provide redundant routing in many different networks. For example, the router could be configured to connect redundantly with a single backbone. Additionally or alternatively, the router could be configured to accept duplicate packets. Further, router configurations are contemplated that could accommodate various types of redundancy protocols that do not necessarily operate as shims between OSI network and data link layers. For example, a redundancy protocol may also be implemented above the transport layer, and in some router configurations a UDP or TCP port ID is assigned for such purpose. In the present exemplary implementation, when the router 132 receives a packet from the backbones A and/or B, the router 132 processes AREP information on the packet and determines, among other things, whether to transmit the packet to user device(s) or drop the packet. The router may configure such a packet for transmission to a user device, e.g., through an IP-over-Ethernet subnet 146.

Figure 4:
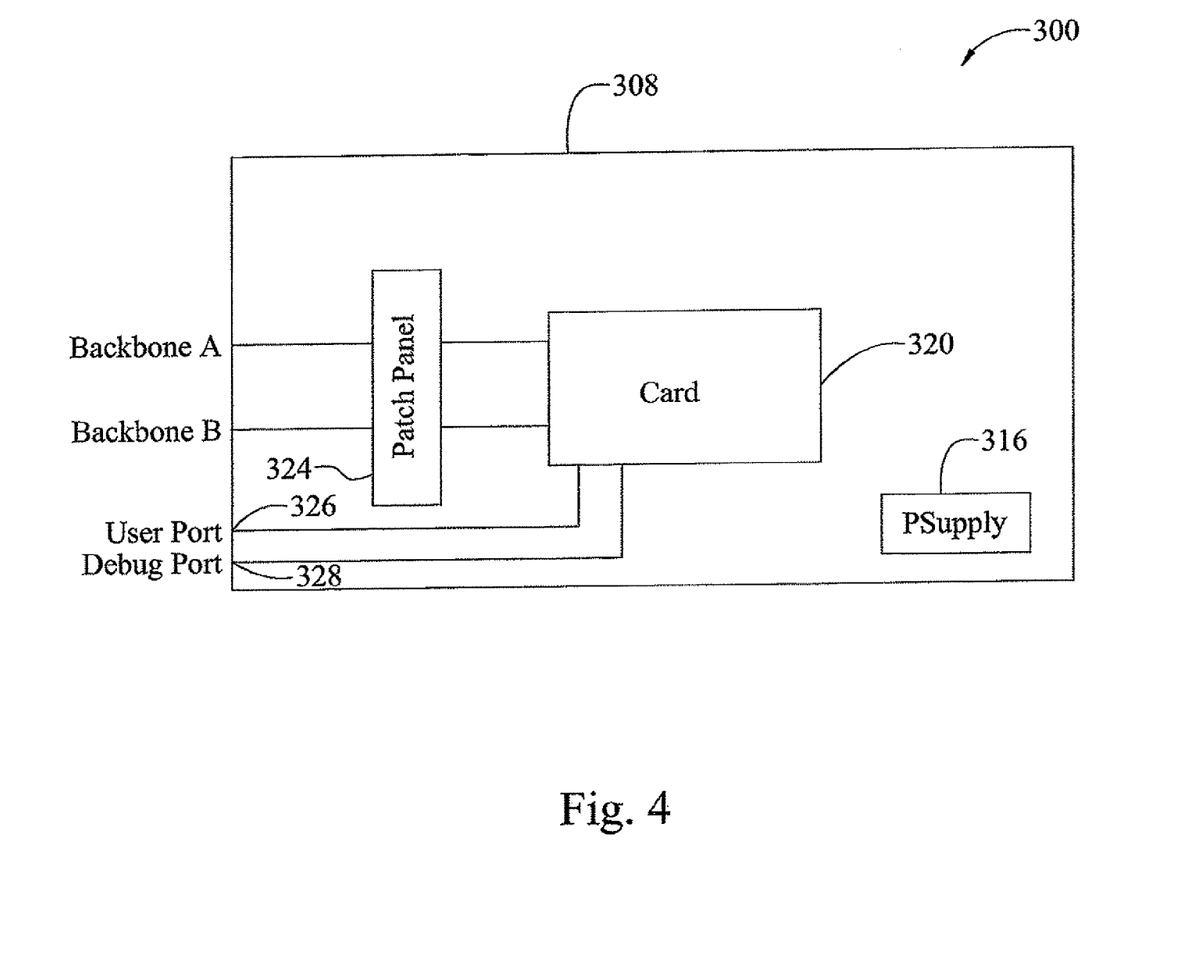
FIG. 4 is a diagram of a router in accordance with one implementation of the disclosure.

In various configurations of a router in accordance with the disclosure, control and redundant communication between a user and a network can be implemented using a communications processor and its local bus within a single high-speed module and enclosure. One configuration of a redundant router is indicated generally in FIG. 4 by reference number 300. The router 300 has an enclosure 308. The enclosure 308 may have a small form factor. For example, in some embodiments the enclosure may have outer dimensions of about 15 by 27 by 6 inches. The enclosure 308 may be ruggedized, for example, for use in military applications and/or applications for which durable packaging is desirable. The enclosure may be watertight. Inside the enclosure 308 are a power supply 316 and a circuit card 320 that interfaces with a patch panel 324, a user port 326 and a debug port 328. The patch panel 324 may be used to connect the circuit card 320, e.g., to backbones of a network. It should be noted that in the router 300, redundant routing can be provided by the single circuit card 320. It also is contemplated that other or additional types of cards could be provided for other or additional functionality.

Figure 5:
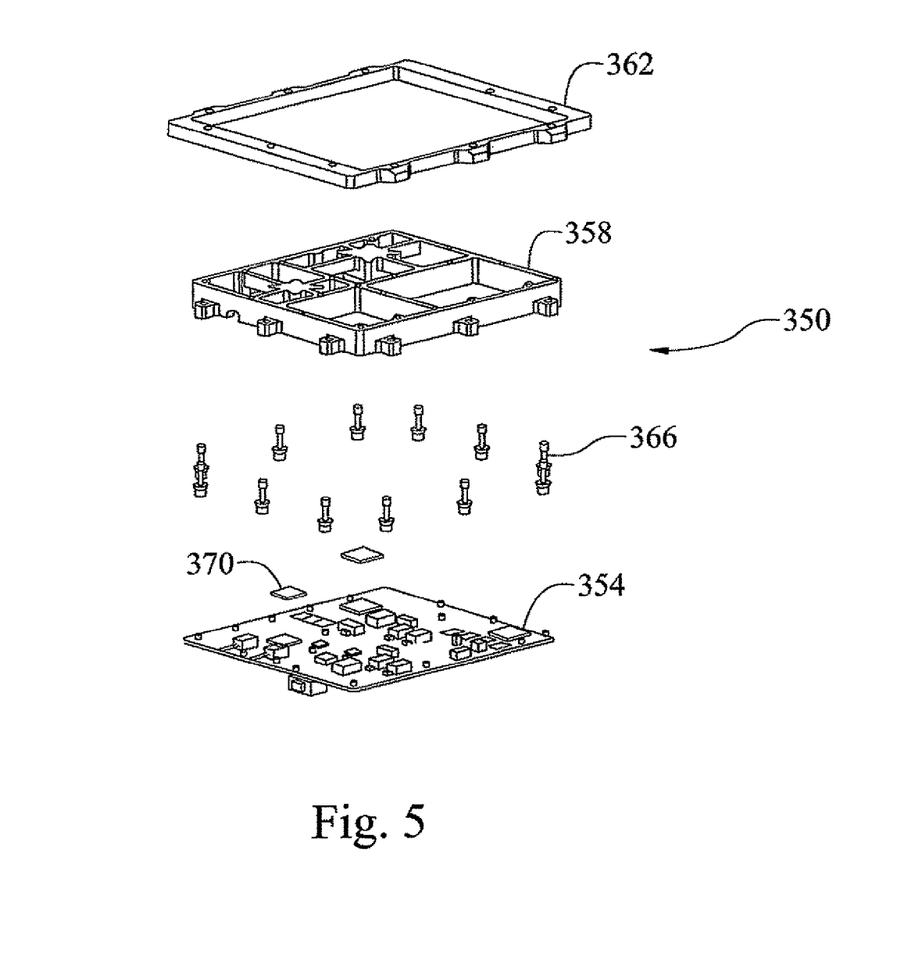
FIG. 5 is an exploded perspective view of a passive heat sink arrangement in accordance with one implementation of the disclosure.

In some router configurations, cooling may be provided by means of a heat sink plate. One configuration of a passive heat sink arrangement is indicated generally in FIG. 5 by reference number 350. The arrangement 350 includes a router printed wiring assembly 354, a heat sink frame 358, and a mount 362 that is part of a router chassis. Captive hardware 366 is used to secure the heat sink frame 358 between the printed wiring assembly 354 and mount 362. Gap filler material 370 may also be provided. The heat sink frame 358 is sized, shaped and positioned so as to provide a cooling capacity that is passive and also shock- and vibration-proof. In the configuration shown in FIG. 5, no fan is needed. In various configurations, however, the enclosure may include a cooling fan.

Figure 6:
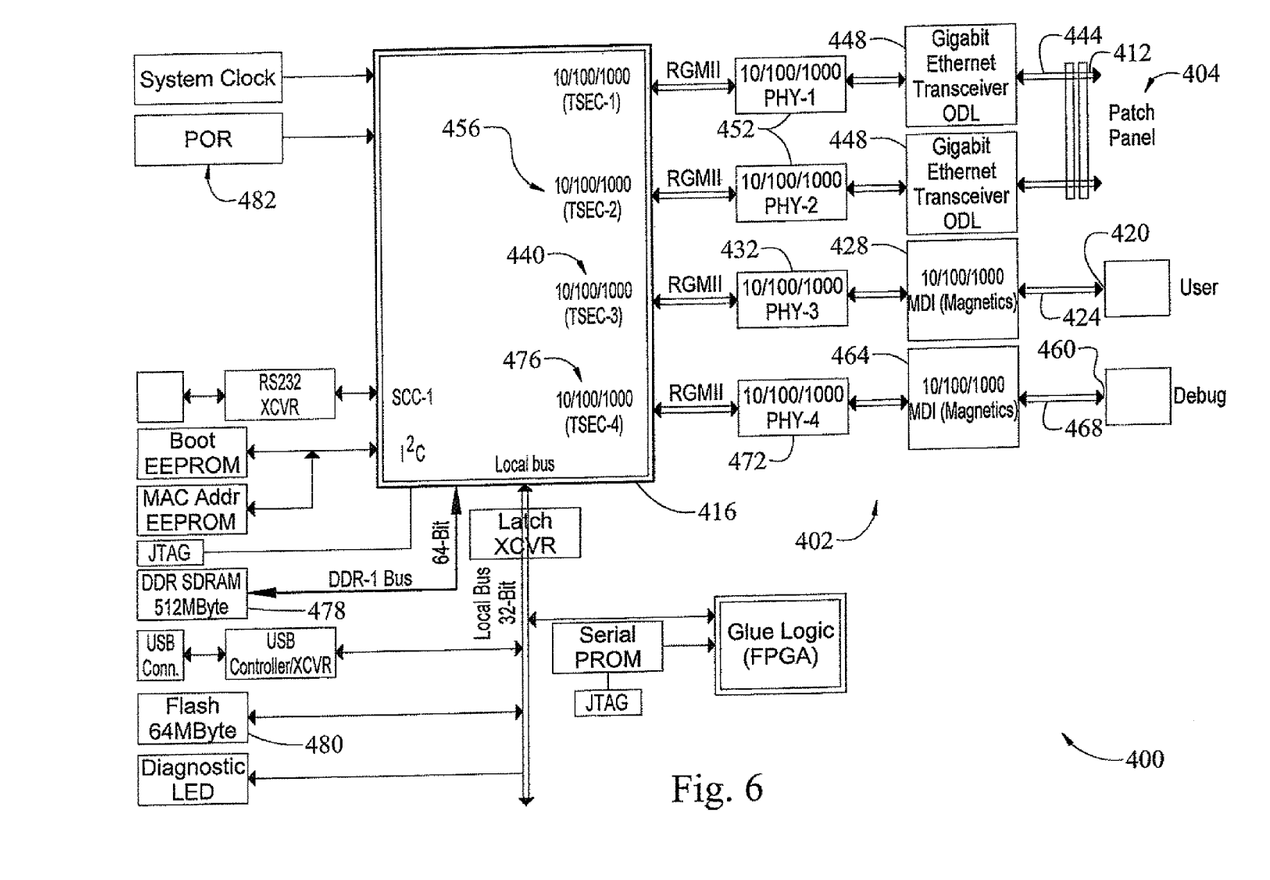
FIG. 6 is a diagram of a router circuit card assembly in accordance with one implementation of the disclosure.

A block diagram of an exemplary circuit card assembly for redundant routing is indicated generally in FIG. 6 by reference number 400. A circuit card 402 interfaces with a patch panel 404 through a pair of interface ports 412. The circuit card 402 includes a processor 416, which may be, e.g., a PowerQUICC™ III processor available from Freescale Semiconductor, Inc. of Austin, Tex. A user port connection 420 provides access by one or more user devices to the processor 416. The connection 420 may include, for example, an RJ-45 connector. In some configurations, the connection 420 may be ruggedized and captive in an enclosure (not shown in FIG. 6) enclosing the card 402. The connection 420 may include, for example, a nine-pin micro DIN. Components of a micro DIN can fit firmly together by virtue, e.g., of sturdy construction and an additional number of pins compared to the eight pins provided on a typical RJ-45 connector. Other types of connectors could also be used. It also should be noted that two or more user ports could be provided in various router configurations.

In the present exemplary configuration, the user port 420 is an access network interface for connecting with user device(s) via one or more user switch enclosures (USEs) (not shown). Through the user port 420, signals carrying 10/100/1000 Mb/s Ethernet may be fanned out via USEs to local IP hosts. A USE is, for example, a shock-tested and connectorized box that houses a ruggedized 100 Mb/s or 1 Gb/s Ethernet Layer 2 switch. A USE may be given a signal fan-out function so that it would not be necessary to specify multiple ports in a router that includes the card 402.

Data received and sent through the user port 420 is transmitted via copper twisted pair 424 between the connection 420 and a medium dependent interface (MDI) transceiver 428. It should be noted that in various implementations, other types of connections could be used instead of copper twisted pair. In some configurations, a user may connect via optical connection. In such case, the router is fitted with an optical interface or alternatively with an optical-to-copper interface.

The magnetics 428 communicate at, e.g., 10, 100 and/or 1000 Mbps (megabits per second), with a physical layer transceiver 432. A magnetic transceiver may be, e.g., a Pulse Engineering H5007. A PHY transceiver may be, e.g., a Marvell 88E1145. Ethernet frames are sent between the PHY transceiver 432 and a triple speed Ethernet controller (TSEC) 440 of the processor 416 at, e.g., 10, 100 and/or 1000 Mbps, via reduced gigabit media-independent interface (RGMII) protocol.

Data received and sent through each of the backbone network interface ports 412 is transmitted via optical fiber 444 between the patch panel 404 and a Gigabit Ethernet transceiver 448. Connections between the patch panel 404 and the optical fibers 444 may be, for example, via ST connectors. Each transceiver 448 includes a serializer/deserializer (SerDes) capability and communicates with a physical layer transceiver 452. Ethernet frames are sent between a PHY transceiver 452 and a triple speed Ethernet controller (TSEC) 456 of the processor 416 at, e.g., 10, 100 and/or 1000 Mbps, via reduced gigabit media-independent interface (RGMII) protocol. A transceiver 448 may be, e.g., a Stratos RRK0-LJ24MB optical transceiver. It should be noted that in various implementations, other types of connections, for example, copper twisted pair connections, could be used instead of optical interfaces.

Debugging may be performed via a debug connection 460, which may be, e.g., a micro DIN or RJ45 connection. Data received and sent through the debug port 460 is transmitted between the port 460 and a medium dependent interface (MDI) transceiver 464. Data received at the debug port 460 is transmitted via copper twisted pair 468, although other types of connections, e.g., optical connections, could be used. The transceiver 464 communicates at, e.g., 10, 100 and/or 1000 Mbps (megabits per second), with a physical layer transceiver 472. Ethernet frames are sent between the transceiver 472 and a triple speed Ethernet controller (TSEC) 476 of the processor 416 at, e.g., 10, 100 and/or 1000 Mbps, via reduced gigabit media-independent interface (RGMII) protocol. Also provided in the card 402 are double-data-rate (DDR) random access memory (RAM) 478 and flash memory 480. A power supply 482 may be made available through a D-miniature connection.

In operation, a router that includes the circuit card 402 performs MAC (medium access control) using the four TSEC controllers 456. The processor 416 configures IP-over-Ethernet packets received through the user port 420 from a user device as AREP frames for simultaneous, redundant transmission via controllers 456 and the optical ports 412 to two network backbones. When the processor 416 receives AREP frames from the backbone networks through the optical ports 412, it drops duplicate frames and transmits non-duplicate frames as IP-over Ethernet packets via the communications controller 440 and user port 420 to appropriate user device(s).

The foregoing router can communicate with a plurality of networks simultaneously, reliably, and quickly. The current data multiplex system (DMS) requires an input/output enclosure, a system controller module, two network backbone controller modules and one Ethernet network interface module to support communications between IP users and the network. Additionally, communications are transmitted through a backplane bus that may operate at speeds less than current Ethernet and IP stack speeds in host computers. Thus the bus could tend to cause bottlenecks as the number of network users increases. In contrast, in various configurations of the foregoing router, essentially all control and data communications between user and network are implemented with the single communications processor and local bus of the router. Accordingly, speeds of communication between users and a network are no longer limited, e.g., by backplane bus bandwidths. In case of a complete loss of communications in one network, communications can be maintained as another network continues to operate. The single router enclosure can be small and lightweight compared to other router enclosures and may be ruggedized for increased durability and dependability. The foregoing router can provide high-speed performance at low cost and can be configured using many if not all COTS (commercial off-the-shelf) components.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of routing data between a user device and a network, the method comprising:

connecting with the user device through a user interface of a circuit card of a router;

through a plurality of backbone interfaces of the circuit card, connecting with the network through a plurality of separate packet-switched backbone subnets to provide redundant communication of data frames through a virtual subnet that includes the backbone subnets;

receiving a packet from the user device through the user interface;

encapsulating the received packet in a plurality of redundant data frames in accordance with a redundancy protocol for transmission of the frames through the backbone interfaces and the backbone subnets; and transmitting the encapsulated packet redundantly to the network;

the method performed by the router.

2. The method of claim 1, wherein the protocol is provided as a shim layer between two standard protocol layers.

3. The method of claim 2, wherein the protocol layers are in accordance with the Open Systems Interconnection (OSI) model.

4. The method of claim 1, further comprising:
- selecting one of a plurality of redundant data frames received by the router through the backbone interfaces; and
- reconfiguring the data packet of the selected frame for transmission of the data packet through the user interface to the user device.

5. The method of claim 1, further comprising receiving the packet from the user device using Internet Protocol (IP) over Ethernet.

6. The method of claim 4, wherein the router routes data over the network between an Internet Protocol (IP) end user device and a non-IP end user device, the method further comprising performing the routing via a local bus of the router.

* * * * *